United States Patent
Zacherle et al.

(10) Patent No.: US 10,507,623 B2
(45) Date of Patent: Dec. 17, 2019

(54) PRESSING TOOL WITH OPTIMIZED RESIN FLOW

(71) Applicant: Bayerische Motoren Werke Aktiengesellschaft, Munich (DE)

(72) Inventors: Bernd Zacherle, Munich (DE); Hubert Burlefinger, Furth (DE); David Fuchs, Landshut (DE); Thomas Passreiter, Geiselhoering (DE); Bernhard Staudt, Munich (DE); Tobias Wiethaler, Altdorf (DE); Andreas Eberl, Reisbach (DE); Thomas Meier, Landshut (DE); Thomas Unterhauser, Vilsbiburg (DE); Johannes Mendel, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 601 days.

(21) Appl. No.: 15/334,319

(22) Filed: Oct. 26, 2016

(65) Prior Publication Data
US 2017/0043543 A1 Feb. 16, 2017

Related U.S. Application Data

(63) Continuation of application No. PCT/EP2015/063002, filed on Jun. 11, 2015.

(30) Foreign Application Priority Data

Jul. 8, 2014 (DE) .................. 10 2014 213 187

(51) Int. Cl.
*B29C 43/02* (2006.01)
*B29C 70/54* (2006.01)
(Continued)

(52) U.S. Cl.
CPC ............ *B29C 70/548* (2013.01); *B29C 33/42* (2013.01); *B29C 70/48* (2013.01); *B29C 2033/422* (2013.01); *B29K 2105/0872* (2013.01)

(58) Field of Classification Search
CPC ... B32B 37/12; B29C 2043/023; B29C 43/32; B29C 43/36
See application file for complete search history.

(56) References Cited

U.S. PATENT DOCUMENTS

| | | |
|---|---|---|
| 5,087,193 A | 2/1992 | Herbert, Jr. |
| 5,721,034 A | 2/1998 | Seemann, III et al. |
| (Continued) | | |

FOREIGN PATENT DOCUMENTS

| | | |
|---|---|---|
| DE | 198 50 462 A1 | 5/2000 |
| DE | 199 22 799 A1 | 11/2000 |
| (Continued) | | |

OTHER PUBLICATIONS

Chinese-language Office Action issued in counterpart Chinese Application No. 201580014967.8 dated Feb. 5, 2018 with English translation (10 pages).

(Continued)

*Primary Examiner* — Joseph S Del Sole
*Assistant Examiner* — Thu Khanh T Nguyen
(74) *Attorney, Agent, or Firm* — Crowell & Moring LLP

(57) ABSTRACT

A pressing tool is provided for producing fiber composite components, including a first tool part and a second tool part moveable relative to the first tool part. In the closed state of the pressing tool, the two tool parts form a shaping cavity for accommodating a fiber semi-finished product to be shaped and each have a tool surface delimiting the cavity. In addition, at least one of the tool surfaces has at least two adjacent flat sections inclined toward each other which are connected to each other by way of a curved transition section. The curved transition section has at least one groove-shaped recess facing the cavity.

18 Claims, 3 Drawing Sheets

(51) Int. Cl.
*B29C 70/48* (2006.01)
*B29C 33/42* (2006.01)
*B29K 105/08* (2006.01)

(56) References Cited

U.S. PATENT DOCUMENTS

| | | | |
|---|---|---|---|
| 5,885,513 A | 3/1999 | Louderback et al. | |
| 7,213,437 B2* | 5/2007 | Osumi | B21D 5/00 |
| | | | 72/379.2 |
| 2013/0221570 A1 | 8/2013 | Lesizza et al. | |
| 2014/0096892 A1* | 4/2014 | Cho | B32B 37/12 |
| | | | 156/99 |

FOREIGN PATENT DOCUMENTS

| | | |
|---|---|---|
| DE | 696 26 645 T2 | 3/2004 |
| DE | 10 2012 211 127 A1 | 4/2014 |
| WO | WO 2009/003476 A1 | 1/2009 |
| WO | WO 2012/163690 A1 | 12/2012 |

OTHER PUBLICATIONS

German-language Search Report issued in counterpart German Application No. 10 2014 213 187.1 dated Dec. 10, 2014 with English translation (15 pages).
International Search Report (PCT/ISA/210) issued in PCT Application No. PCT/EP2015/063002 dated Oct. 2, 2015 with English translation (6 pages).
German-language Written Opinion (PCT/ISA/237) issued in PCT Application No. PCT/EP2015/063002 dated Oct. 2, 2015 (5 pages).

* cited by examiner

PRESSING TOOL WITH OPTIMIZED RESIN FLOW

CROSS REFERENCE TO RELATED APPLICATIONS

This application is a continuation of PCT International Application No. PCT/EP2015/063002, filed Jun. 11, 2015, which claims priority under 35 U.S.C. § 119 from German Patent Application No. 10 2014 213 187.1, filed Jul. 8, 2014, the entire disclosures of which are herein expressly incorporated by reference.

BACKGROUND AND SUMMARY OF THE INVENTION

The invention relates to a pressing tool for producing composite fiber components having a first tool portion and a second tool portion which is movable relative thereto, wherein the two tool portions form, in the closed state of the pressing tool, a forming cavity for receiving a semi-finished fiber product which is intended to be formed and have a tool surface which delimits the cavity.

During the production of composite fiber components, the so-called "Resin Transfer Moulding" method (RTM method for short) is often used. In this instance, a "dry" semi-finished fiber product which is not yet impregnated is inserted into a pressing tool which usually comprises a lower tool and an upper tool which can be displaced relative thereto. Both tools form in the closed state at least one forming tool cavity between them. After the semi-finished fiber product has been inserted into the cavity, the tool is closed and the tool cavity is filled with a plastics mass or resin mass (hereinafter referred to as the matrix) which is connected to the inserted semi-finished fiber product and which hardens under the action of pressure and heat. After the hardening operation, the pressing tool is opened in order to remove the fiber-reinforced composite fiber component produced in this manner. A corresponding RTM tool is known, for example, from DE 199 22 799 A1.

In particular in regions of the semi-finished fiber product which are subjected to a high degree of deformation during the processing in the pressing tool, the resin flow is made more difficult as a result of the powerful deformation of the fiber material. Therefore, it can readily result in the production of poorly impregnated or non-impregnated locations (so-called dry locations) or pores in the subsequent component, which weaken the strength thereof at least locally. In accordance with the severity of those weak locations, under some circumstances the component may no longer be suitable for the application it is provided for.

Those weak locations are generally prevented by attempting to avoid high degrees of deformation, for example, as a result of tool edges with small, sharp edge radii. However, the configuration freedom for the component geometry is thereby restricted in such a manner that implementation is not possible in all cases. Alternatively, therefore, attempts are made to obtain a better resin flow in all regions of the component by way of extended injection times in order to avoid the defective locations mentioned. However, the processing time for each component is thereby increased substantially.

An object of the invention is therefore to provide a pressing tool which allows, in a simple and reliable manner, dry locations to be avoided during the production of composite fiber components and, at the same time, a processing and injection time which is as short as possible to be achieved.

This and other objects are achieved with a pressing tool for producing composite fiber components having a first tool portion and a second tool portion which is movable relative thereto. The two tool portions form, in the closed state of the pressing tool, a forming cavity for receiving a semi-finished fiber product which is intended to be formed, and have a tool surface which delimits the cavity. At least one of the tool surfaces comprises at least two adjacent and mutually inclined or angled surface portions which are connected to each other by a curved transition portion. Furthermore, the curved transition portion has at least one channel-like recess which faces the forming cavity.

The pressing tool described therefore includes at least the two tool portions (for example, an upper tool and lower tool) which, as a bottom die and upper die, have a three-dimensionally formed tool surface and engage one in the other when the pressing tool is closed in order to confer a corresponding, three-dimensional form on the semi-finished fiber product inserted therein.

In other words, therefore, the three-dimensionally formed tool surface delimits the cavity and consequently acts in a forming manner for the semi-finished fiber product which is intended to be formed. To this end, the tool surface usually has a plurality of surface portions which are inclined differently relative to each other or which are orientated in an angled manner relative to each other. Each of those surface portions may be constructed in a planar (substantially two-dimensional) or three-dimensionally formed manner, in particular curved.

There may be provided between adjacent and differently inclined surface portions a curved transition portion, via which the surface portions are connected to each other. The transition portion is itself also a portion of the tool surface and constitutes a "flowing" constant transition of the two surface portions relative to each other. Generally, the transition portion is curved more powerfully than the surface portions so that in the region of the transition portion the semi-finished fiber product is subjected to higher degrees of deformation at least locally than as a result of the surface portions themselves.

For example, great degrees of deformation, in particular degrees of deformation between 30° and 90°, which can negatively influence a resin flow, may occur in accordance with the angling of the surface portions relative to each other when the pressing tool is closed in the region of those transition portions.

The one or more recess(es) of the transition portion are provided in order to allow a matrix flow in the region of the curved transition portion in spite of the deformation of the semi-finished fiber product and consequently the reliable impregnation thereof. This is carried out in that the matrix is directed through the recesses outside the semi-finished fiber product into the regions of the more powerful deformations and, at that location, can be introduced into the surface of the semi-finished fiber product in an inward direction from the recess. Consequently, the formation of dry locations or pores is prevented in an effective and simple manner. An extension of the injection time is also unnecessary.

The one or more recess(es) is/are preferably constructed as so-called "perforations" and can readily be formed in the tool surface.

The curved transition portion may have, for example, a convex or concave curvature. In both cases, the matrix is introduced via the recesses into the regions of the curved transition portions in order to impregnate the correspondingly deformed locations of the semi-finished fiber product in a secure and reliable manner.

The at least one recess preferably extends from an end of the curved transition portion, which end adjoins the first surface portion, as far as an end of the curved transition portion, which end adjoins the second surface portion. This has the advantage that both ends of the recess are arranged in regions of the tool surface which do not have any curvature or have only slight curvature. Therefore, the matrix can be distributed in a practically unimpeded manner at that location so that dry locations do not occur in those regions. In addition, the matrix can be introduced into the recess via the ends of the recess which are provided in those regions and can flow in the extent direction of the recess. The matrix is reliably introduced via the recess into the (more powerfully) curved region of the transition portion and also ensures at that location the impregnation of the semi-finished fiber product.

In accordance with another embodiment, the at least one recess can extend from an end of the curved transition portion, which end adjoins the first surface portion, as far as a location in the second surface portion. In this instance, the end of the recess arranged in the second surface portion is preferably nearer a gate system for supplying the matrix than the opposite end of the recess, which end is associated with the first surface portion. For example, the recess may project from 2 to 50 mm, preferably approximately 10 mm, into the second surface portion. Naturally, the recess may also project, where applicable, into the first surface portion in the same manner and to the same extent.

For example, the curved transition portion may be constructed as a rounded edge. This means that the transition portion defines a portion in which the two surface portions meet as a common edge, wherein the edge is rounded with an edge radius. The transition portion is in this case defined by the rounded connection portion. The edge radius is preferably between 2 and 10 mm. The two surface portions define, for example, an angle β of from $90°≤β≤135°$ (cf. FIG. 1: β1 and β2).

The at least one recess may further be constructed as a channel-like notch or indentation. In principle, the cross-section of the recess may be formed, for example, in a V-shaped or U-shaped manner. However, other cross-sections are also able to be used as long as a sufficient discharge of matrix from the recess to the semi-finished fiber product can be achieved in the region of the transition portion.

Furthermore, an extent direction of the at least one recess may be orientated at an angle α between $0°<α≤±90°$, preferably between $±30°<α≤±60°$, in particular of substantially $α=±45°$, relative to an extent direction of the curved transition portion.

According to another embodiment, the curved transition portion has at least two recesses, wherein the recesses are orientated parallel with each other in the extent direction thereof. A plurality of recesses which each have a spacing of from 2 to 20 mm, particularly preferably from 5 to 10 mm, relative to the adjacent recess may preferably be provided.

Additionally or alternatively, the curved transition portion may have at least two recesses, wherein the two recesses are orientated relative to each other at an angle γ between $0°<γ≤±90°$, preferably between $±30°≤γ≤±90°$, in particular of substantially $γ=±90°$. The correspondingly orientated recesses may be arranged with spacing from each other or in an intersecting manner.

The at least one recess preferably has a depth of at least 0.5 mm, preferably at least 2 mm, particularly preferably a depth between 2 mm and 3 mm. The geometry of the recesses is preferably selected in such a manner that a negative influence of the semi-finished fiber product, for example, as a result of introduction of the semi-finished fiber product into the recess, is (substantially) prevented. In this case, a width of the recess or the opening thereof with respect to the cavity of from 1 to 10 mm, preferably from 2 to 5 mm, is advantageous.

In principle, the pressing tool may be constructed as an RTM tool or as a wet pressing tool.

Although the above explanations have always been set out in connection with the best possible matrix flow in the semi-finished fiber product in the context of a resin injection, the explanations apply similarly to wet-pressing of a semi-finished fiber product which has already been pre-impregnated. In this case, there may also be produced a local displacement of the matrix in the semi-finished fiber product, and consequently destruction of the complete impregnation, as a result of high degrees of deformation in particular in the region of powerfully curved transition portions. In this case, the recesses also allow the provision of a compensating resin flow into the transition portion and, consequently, also prevent the production of dry locations or pores.

It will be understood that the tool portion described may have one or more of the transition portions described. They may also have an identical or different number, arrangement and orientation of the recesses.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
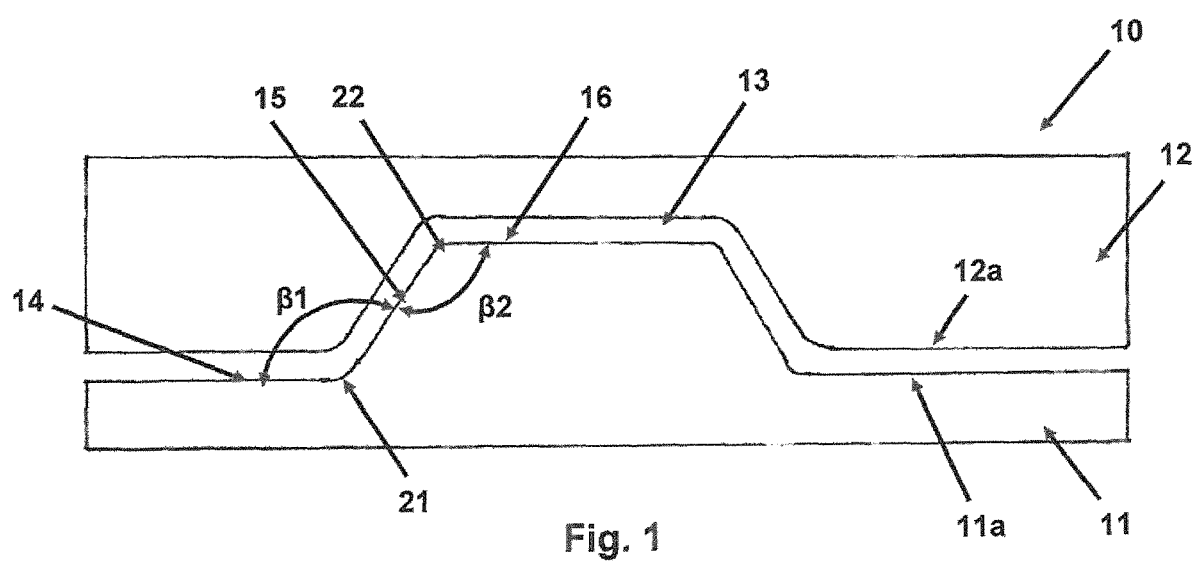
FIG. 1 is a schematic block diagram of an exemplary pressing tool for producing a composite fiber component.

FIG. 1 shows a pressing tool 10 for producing composite fiber components from semi-finished fiber products, having a first tool portion 11 and a second tool portion 12 which is movable relative thereto. The two tool portions 11, 12 form, in the closed state of the pressing tool according to FIG. 1, a forming cavity 13 for receiving the semi-finished fiber product which is intended to be formed (not shown) and each have a tool surface 11a, 12a which delimits the cavity.

Both tool surfaces 11a, 12a include a plurality of (planar) surface portions which are adjacent to each other and which are inclined relative to each other. The inclined surface portions are connected to each other by way of curved transition portions.

For the sake of clarity, only the construction of a portion of the tool surface 11a of the lower tool half 11 is described in greater detail. The same also applies where applicable to the remaining corresponding portions of the tool surface 11a and the entire second tool surface 12a.

In the embodiment illustrated, the tool surface 11a includes the two adjacent surface portions 14, 15 which are angled relative to each other at the angle β1 or the two adjacent surface portions 15, 16 which are angled relative to each other at the angle β2. They are each connected to each other by way of a curved transition portion 21 or 22, respectively. The respective transition portion 21 or 22 therefore defines the curved region of the edge, at which the two surfaces 14 and 15 or 15 and 16 meet.

When the pressing tool 10 is closed and the inserted semi-finished fiber product is pressed, it is subjected, in comparison with the surface portions 14, 15 and 16, in the region of the transition portions 21 and 22 to a high level of deformation which would normally result in a reduced local matrix flow and therefore dry locations in the produced composite fiber component. However, that occurrence can effectively be prevented by the recesses 18, 19, 20 illustrated in FIGS. 2 and 3.

Figure 2:
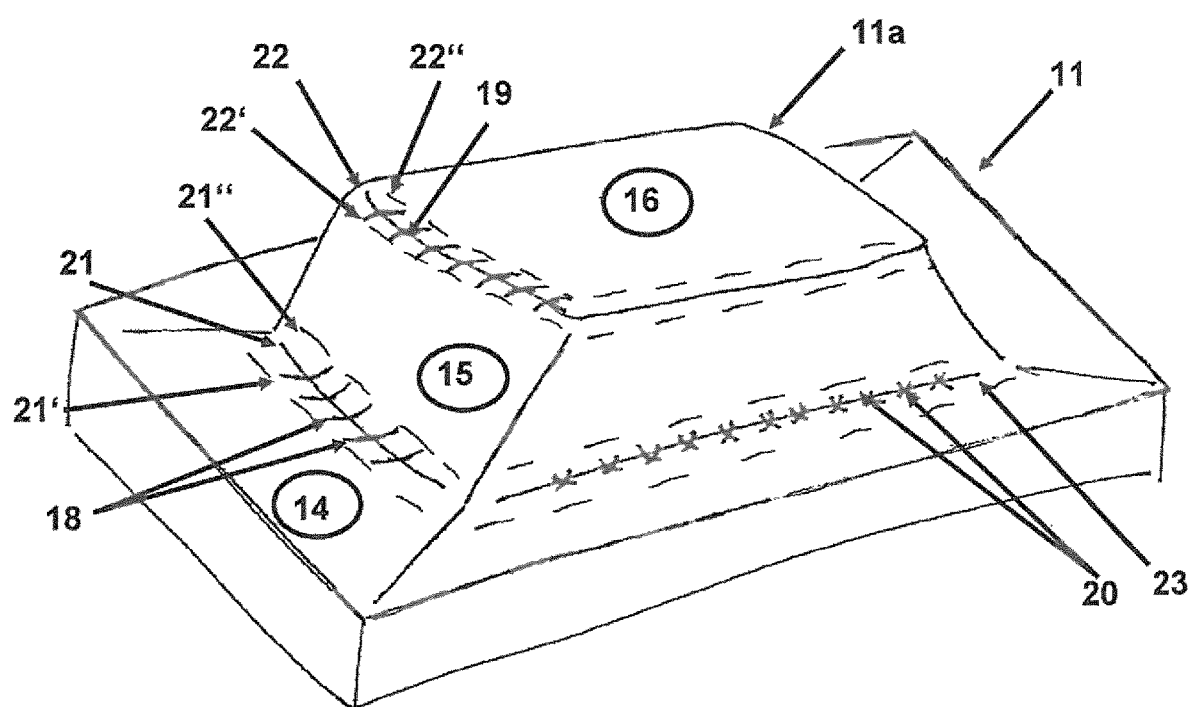
FIG. 2 is a perspective view of a tool portion of the pressing tool from FIG. 1.

FIG. 2 is a simple schematic, perspective view of the tool portion 11 of the pressing tool 10 from FIG. 1. The first transition portion 21 has a concave curvature with respect to the cavity 13. However, the second transition portion 22 is curved in a convex manner. The curved transition portion 21 or 22 constitutes—as described in other words—a rounded edge between the surface portions 14 and 15 or 15 and 16 which are adjacent at each of the two sides. Each of the curved transition portions 21 and 22 further includes a number of recesses 18, 19 which face the cavity, wherein each of those recesses 18, 19 is constructed as a notch or indentation in the tool surface 11a.

Each of the recesses 18 of the transition portion 21 extends in the extent direction thereof (cf. FIG. 3) from a first end 21' of the curved transition portion 21, which end adjoins the first surface portion 14, as far as a second end 21" of the curved transition portion 21, which end adjoins the second surface portion 15. Both ends 21' and 21" of the transition portion 21 are intended to be understood to be a continuous transition of the respective surface portion 14 or 15 into the curvature of the transition portion 21, respectively.

The same applies to the recesses 19 of the transition portion 22 which extend from a first end 22' of the transition portion 22 as far as a second end 22" of the transition portion 22.

A third transition portion 23 having an intersecting arrangement of recesses 20 is illustrated purely by way of example for visualization purposes.

The arrangement of all the recesses illustrated is intended to be understood to be purely exemplary and for visualization of a plurality of different embodiments. Naturally, one or more recess(es) may be provided at each transition portion or only at individual transition portions of the tool portion 11.

Therefore, each transition portion can be constructed individually or in accordance with requirements with or without recesses. Similarly, a number, arrangement, orientation and geometry of each individual recess may be selected independently of other recesses.

Figure 3:
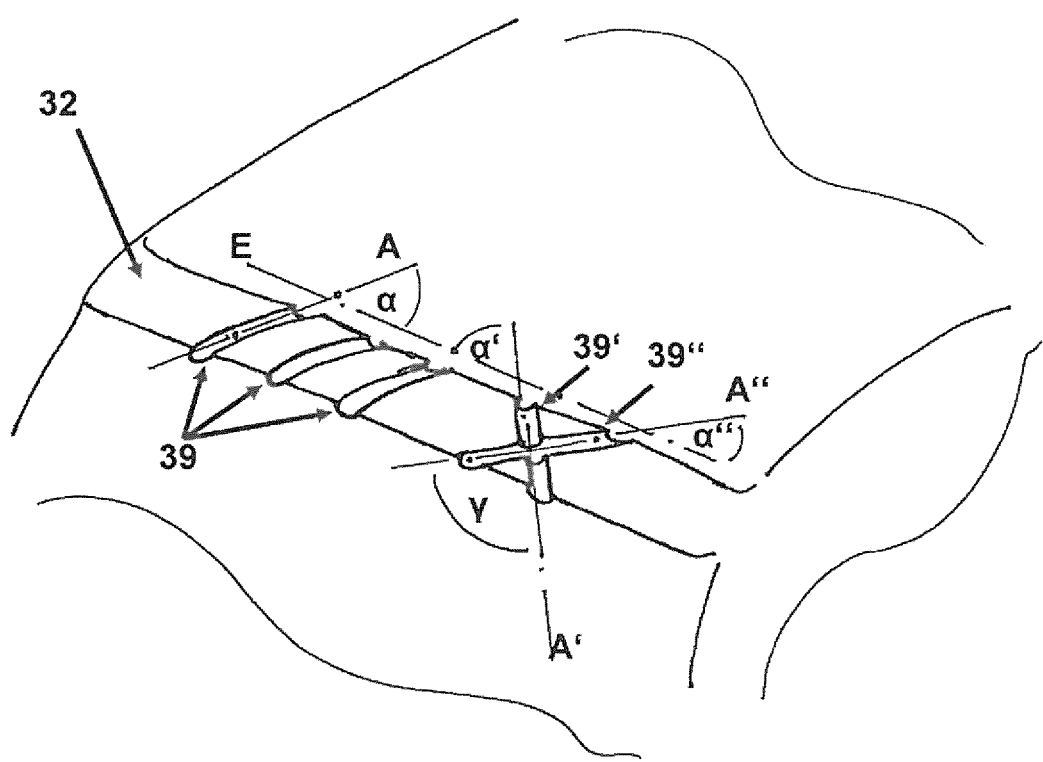
FIG. 3 is a detailed view of a transition portion with a plurality of variants of recesses for an exemplary tool portion according to the invention.

Accordingly, FIG. 3 shows, simply as an example, a selection of different orientation variants of the recesses 39 or 39' and 39" on a convex-curved transition portion 32 with an extent direction E. The respective extent direction A of the first three recesses 39 is orientated at an angle α of, for example, approximately α=45° relative to the extent direction E of the curved transition portion 32. The three recesses 39 are further orientated parallel with each other in terms of the extent direction A thereof. For the sake of clarity, only the extent direction A of the first recess 39 is indicated (on the left in FIG. 3).

In place of a parallel arrangement of the recesses relative to each other, for example, there is also the possibility of an intersecting orientation, as is intended to be illustrated with reference to the two recesses 39' and 39". In this instance, the extent directions A' and A" of the two channel-like recesses 39' and 39" may be orientated relative to each other at an angle γ between 0° and ±90°, preferably between ±30° and ±90°, in particular at an angle of substantially γ≈90°. Accordingly, the angles α' and α" are intended to be selected relative to the extent direction E of the transition portion 32.

A depth of the recesses 39, 39' and 39" is not illustrated. That depth may be, for example, at least 0.5 mm, preferably at least 2 mm, particularly preferably between 2 and 3 mm.

Since FIG. 3 shows purely exemplary examples of the recesses and the arrangement thereof, it is self-evident that—as already described—either no recesses or any number of recesses may be arranged at a transition portion. The respective arrangement and orientation of each individual recess may also be constructed individually and may, in particular, be adapted to local requirements of the pressing tool.

Therefore, it is possible to arrange per transition portion all the recesses exclusively parallel with each other or the recesses exclusively intersecting with respect to each other, in particular intersecting in pairs. Naturally, however, mixed arrangements are also possible.

Not only is the construction described suitable for a convex transition portion but it may also be provided in a similar manner for a transition portion with a concave curvature.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pressing tool for producing composite fiber components, comprising:
   a first tool portion;
   a second tool portion movable relative to the first tool portion, wherein the first and second tool portions form, in a closed state of the pressing tool, a forming cavity that receives a semi-finished fiber product intended to be formed, each of the first and second tool portions having a tool surface delimiting the cavity,
   at least one of the tool surfaces comprises at least two adjacent and mutually inclined surface portions connected to each other via a curved transition portion, and
   the curved transition portion has at least one channel-shaped recess facing the cavity.

2. The pressing tool according to claim 1, wherein the curved transition portion has a convex curvature.

3. The pressing tool according to claim 1, wherein the curved transition portion has a concave curvature.

4. The pressing tool according to claim 1, wherein
   the at least one channel-shaped recess extends from an end of the curved transition portion, which end adjoins a first surface portion of the at least two adjacent and mutually inclined surface portions, as far as an end of the curved transition portion, which end adjoins a second surface portion of the at least two adjacent and mutually inclined surface portions.

5. The pressing tool according to claim 1, wherein the curved transition portion is constructed as a rounded edge.

6. The pressing tool according to claim 1, wherein the at least one channel-shaped recess is constructed as a notch or indentation.

7. The pressing tool according to claim 1, wherein
an extent direction of the at least one channel-shaped recess is oriented at an angle $\alpha$ between $0°<\alpha\leq\pm90°$ relative to an extent direction of the curved transition portion.

8. The pressing tool according to claim 7, wherein the angle $\alpha$ is between $\pm30°<\alpha\leq\pm60°$.

9. The pressing tool according to claim 7, wherein the angle $\alpha$ is substantially $\alpha=\pm45°$.

10. The pressing tool according to claim 1, wherein the curved transition portion has at least two channel-shaped recesses, and further wherein the at least two channel-shaped recesses are oriented parallel with each other in an extent direction thereof.

11. The pressing tool according to claim 1, wherein:
the curved transition portion has at least two channel-shaped recesses,
the extent directions of the two channel-shaped recesses are oriented relative to each other at an angle $\gamma$ between $0°<\gamma\leq90°$.

12. The pressing tool according to claim 11, wherein the angle $\gamma$ is between $\pm30°<\gamma\leq\pm90°$.

13. The pressing tool according to claim 11, wherein the angle $\gamma$ is substantially $\gamma=\pm90°$.

14. The pressing tool according to claim 1, wherein the at least one channel-shaped recess has a depth of 0.5 mm.

15. The pressing tool according to claim 14, wherein the depth is at least 2 mm.

16. The pressing tool according to claim 14, wherein the depth is between 2 mm and 3 mm.

17. The pressing tool according to claim 1, wherein the pressing tool is configured as an RTM tool.

18. The pressing tool according to claim 1, wherein the pressing tool is configured as a wet pressing tool.

* * * * *